United States Patent
Lin et al.

(10) Patent No.: US 10,453,224 B1
(45) Date of Patent: Oct. 22, 2019

(54) PSEUDO-CT GENERATION WITH MULTI-VARIABLE REGRESSION OF MULTIPLE MRI SCANS

(71) Applicants: Ziwei Lin, Greenville, NC (US); Samuel Chen Leu, Greenville, NC (US); Zhibin Huang, Brentwood, TN (US)

(72) Inventors: Ziwei Lin, Greenville, NC (US); Samuel Chen Leu, Greenville, NC (US); Zhibin Huang, Brentwood, TN (US)

( * ) Notice: Subject to any disclaimer, the term of this patent is extended or adjusted under 35 U.S.C. 154(b) by 0 days.

(21) Appl. No.: 16/359,551

(22) Filed: Mar. 20, 2019

Related U.S. Application Data

(60) Provisional application No. 62/648,767, filed on Mar. 27, 2018.

(51) Int. Cl.
| | |
|---|---|
| *G06T 7/00* | (2017.01) |
| *G06T 11/00* | (2006.01) |
| *G06T 7/11* | (2017.01) |
| *G06T 7/33* | (2017.01) |
| *G06T 15/08* | (2011.01) |

(52) U.S. Cl.
CPC .............. *G06T 11/008* (2013.01); *G06T 7/11* (2017.01); *G06T 7/33* (2017.01); *G06T 15/08* (2013.01); *G06T 2207/10088* (2013.01); *G06T 2207/20081* (2013.01); *G06T 2207/30008* (2013.01); *G06T 2210/41* (2013.01)

(58) Field of Classification Search
CPC . G06T 11/008; G06T 7/11; G06T 7/33; G06T 15/08; G06T 2207/10088; G06T 2207/20081; G06T 2207/30008; G06T 2210/41
See application file for complete search history.

(56) References Cited

U.S. PATENT DOCUMENTS

| | | | |
|---|---|---|---|
| 2014/0149092 A1* | 5/2014 | Nadobny | ............... A61N 1/406 703/2 |
| 2016/0310761 A1* | 10/2016 | Li | .......................... A61N 5/1038 |
| 2017/0103287 A1* | 4/2017 | Han | .......................... G06T 5/00 |
| 2017/0131375 A1* | 5/2017 | Schadewaldt | ...... G01R 33/4828 |
| 2018/0137656 A1* | 5/2018 | Li | .......................... A61B 5/0035 |
| 2018/0321345 A1* | 11/2018 | Van Den Brink | ... G01R 33/563 |

* cited by examiner

*Primary Examiner* — Sean T Motsinger

(57) ABSTRACT

The present invention comprises a method for generating a pseudo-CT image volume from multiple MRI scans through determining and then applying multi-variable polynomial mapping functions. An exemplary example extracts intensity values of voxels in images from acquired multiple MRI scans and CT scan from a plurality of training subjects to determine a multi-variable high-degree polynomial function for each of three regions, which is then applied to voxels in corresponding regions from images of multiple MRI scans of the target subject to generate the pseudo-CT image volume.

9 Claims, 2 Drawing Sheets

PSEUDO-CT GENERATION WITH MULTI-VARIABLE REGRESSION OF MULTIPLE MRI SCANS

FIELD OF THE INVENTION

This invention relates to magnetic resonance imaging and a method for the generation of pseudo-computed tomography values and computed tomography images. In particular, a process to utilize a multi-variable regression analysis on multiple magnetic resonance imaging scans to generate a pseudo-computed tomography image volume.

BACKGROUND

Three-dimensional images are acquired by various imaging modalities including computed tomography (CT) and magnetic resonance imaging (MRI). Computed tomography traditionally serves as the modality used in creating treatment plans for radiation therapy. A CT scan accurately represents the entire geometry of a subject, and the CT values can be directly converted to electron densities, which are used in calculating the radiation dose distribution within a subject. However, CT images have poor soft tissue contrast, and CT scanning exposes the subject to additional radiation dose. Compared to CT, the MRI modality has superior soft-tissue contrast, is free of ionizing radiation, and could provide functional information within the subject such as metabolism.

Currently, MRI images are mainly used to complement CT images for more accurate anatomical structure contouring and tumor targeting, therefore an image of the MRI scan of target subject needs to be aligned to the corresponding image of the CT scan. The alignment of MRI and CT images are not exact due to the acquisition of MRI and CT images on different scanning machines, thus contributing to inaccuracy in tumor targeting. In MRI-guided radiation therapy where only MRI scans are used, there is no need for the alignment to CT images and thus tumor target delineation is more accurate. However, MRI intensity values are not directly related to electron densities used for dose calculations, therefore there is an interest in a method for accurately converting MRI images into corresponding images with electron density values, usually CT (referred to as pseudo-CT or pCT) images.

The journal article Edmund and Nyholm, "A Review of Substitute CT Generation for MRI-only Radiation Therapy", Radiat Oncol 12:28 (2017), doi:10.1186/s13014-016-0747-y, reviews various methods employed to create a pCT, including the atlas method and the voxel method. As described in the journal article Dowling et al., "An Atlas-based Electron Density Mapping Method for Magnetic Resonance Imaging (MRI)-Alone Treatment Planning and Adaptive MRI-Based Prostate Radiation Therapy", Int J Radiat Oncol Biol Phys 83, 5 (2012), doi:10.1016/j.ijrobp.2011.11.056, an atlas image is a pre-existing image used as reference to assist in generating a derived image. In the context of generating a pCT, an atlas MRI image and an atlas CT image are used as references for generating a derived CT image from a new MRI image of target subject. The atlas MRI is aligned to the target MRI and the same transformation is applied to the collection of atlas CTs that are fused into a single pCT image. However, there will be certain errors in the registration or alignment of the atlases or from the atlas image to the target MRI image. A voxel method mainly uses the intensity values of voxels from MRI images and CT images to implement a conversion method to create pseudo-CT images without the alignment between MRI images from target subject and training subject.

SUMMARY OF THE INVENTION

It is the aim of this invention to provide a solution to the process of generating a pseudo-CT image volume by means of performing a multi-variable regression analysis on multiple MRI scans. In the preferred embodiment, the method for generating a pseudo-CT image volume by using a multi-variable regression analysis on MRI images of training subjects is to determine the multi-variable functions to map the sets of MRI images from target subject into a set of pseudo-CT images. A set of images represents all images of a subject from a scan.

The method for utilizing a multi-variable regression on multiple MRI scans to generate a pseudo-CT image volume comprises of: acquiring training data from a plurality of training subjects; aligning images from multiple MRI scans to the corresponding image from the CT scan for each training subject; determining the mapping function to convert the MRI intensity values of a voxel in the training data to the corresponding CT value; and creating a set of pseudo-CT images from multiple MRI scans of target subject.

The training data from each training subject consist of multiple MRI scans and one corresponding CT scan. For each training subject, different MRI scan is acquired with a different MRI sequence parameter. For all training subjects, a given set of MRI scan is acquired with the same MRI sequence parameter. In addition, normalization may be required to ensure that average intensity from corresponding MRI scan is the same among different training subjects.

The multiple MRI scans and CT scan are usually acquired on different scanning machines so that alignment is acquired to ensure that corresponding anatomical positions and voxels between MRI images and CT images match.

The process to determine a mapping function to convert the multiple MRI intensity values to a corresponding CT value comprises of: establishing region segmentation mask for each image from the MRI scans and CT scan; extracting the intensity values of voxels from each image from the MRI scans and CT scan; and performing a multi-variable regression analysis on the intensity values to determine the multi-variable high-degree polynomial mapping functions.

The region segmentation of images from multiple MRI scans and CT scan may include the region designations: bone region, soft region, and mixed region. The bone region contains all the skeletal structures, the soft region contains all the non-skeletal structures, and the mixed region, where the mixed region is the area between bone region and soft region where it is uncertain whether the tissue is bony or soft. In addition, an excluded region may need to be designated.

All the intensity values of voxels im images from the multiple MRI scans and CT scan are extracted for each region except for the excluded region. A multi-variable regression is performed on the extracted intensity values of voxels to determine a multi-variable high-degree polynomial mapping function for each region.

The process to generate a pseudo-CT image volume from multiple MRI scans of target subject comprises of: acquiring multiple MRI scans; aligning corresponding images from multiple MRI scans; segmenting images from multiple MRI scans into regions; extracting the MRI intensity values for voxels in each region; applying to multiple MRI intensity values of each voxel the mapping function of the corresponding region to determine its CT value; and all the CT values determined for all voxels constitute the pseudo-CT image volume of target subject.

The multiple MRI scans of target subject are acquired with the same MRI sequence parameters as used in acquiring the multiple MRI scans of training subjects.

Images from each MRI scan of target subject for the same position are aligned to ensure that corresponding anatomical positions and voxels match.

The region segmentation for MRI images of target subjects are in the same manner as described above for the region segmentation of images of training subjects except that an excluded region is not needed for target subject.

The MRI intensity values of all voxels in each region are extracted from images of multiple MRI scans of target subject, the mapping function determined from training data for the corresponding region is applied to the extracted MRI intensity values of each voxel to determine its CT value, and the entirety of the CT values determined for all voxels constitutes the pseudo-CT image volume of target subject.

This method has an accuracy comparable to the best current result of atlas based methods but is faster and more convenient. The presented invention uses a voxel method that directly converts multiple MRI images of target subject into a pseudo-CT image. Therefore, this method does not require alignment of images between training subjects and target subject, thus avoiding possible registration or alignment inaccuracies existing in atlas methods. This invention can be used for MRI-guided radiation therapy treatment planning to simulate dose calculations and for medical imaging.

DETAILED DESCRIPTION OF THE INVENTION

Figure 1:
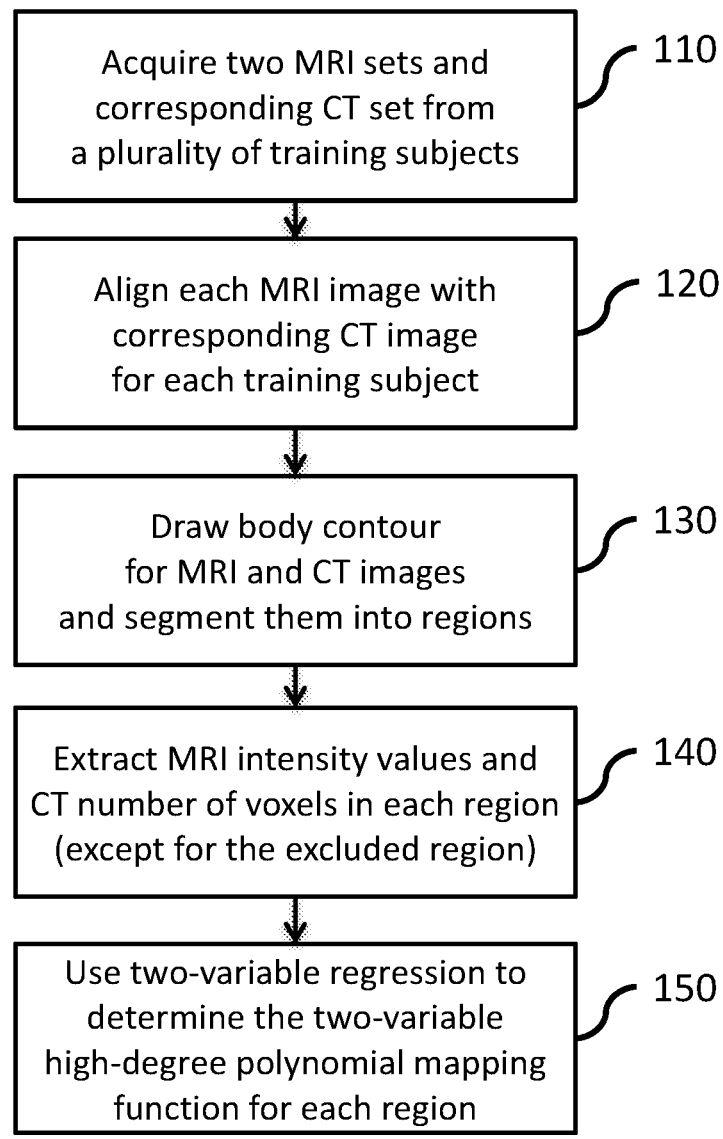
FIG. 1 is an exemplary flowchart illustrating the steps for determining the mapping functions through regression analysis by using two MRI scans and CT scans from the training data.

The method of this invention is described in detail below referencing the embodiments and accompanying drawings. In describing preferred embodiments of the present disclosure the drawings and specific terminology employed are for the sake of clarity only and are not intended to limit the disclosure.

The method for generating a pseudo-CT image volume by using multi-variable regression from multiple MRI scans comprises of the processes described below.

In the preferred embodiment, acquiring the training data includes the acquisition of multiple MRI scans and one corresponding CT scan for each of a plurality of training subjects, wherein for each training subject different MRI scan is acquired with a different MRI sequence parameter and for all training subjects a given set of MRI scan is acquired with the same MRI sequence parameter. When a given set of MRI scan for different training subjects is acquired on different scanning machines and/or different imaging conditions, images from this set of MRI scan need to be normalized to ensure that average MRI intensity from this set of MRI scan among different training subjects is the same. A simple method to decide whether normalization is required is to compare the histograms on the MRI intensity values of voxels for the same area from different training subjects. If the histogram of different training subjects exhibit similar shapes but very different peak and average values, normalization is required. In an exemplary normalization process, first find for each training subject the average MRI intensity value for a given set of MRI scan, and then determine a training subject-specific correction factor to multiply the MRI intensity values of each subject for this set of MRI scan, so that the average intensity values from all training subjects are the same for this given set of MRI scan.

In the preferred embodiment, align all images from each MRI scan to the corresponding image from the CT scan for each training subject. MRI and CT images are usually acquired on different scanning machines and thus the images are not exactly aligned. Therefore, an image registration technique is used to align each MRI image to the corresponding CT image for each training subject to ensure that the corresponding voxels match among images from multiple MRI scans and the CT scan for the same position.

A method utilizing the training data to generate the mapping functions to convert multiple MRI intensity values to the corresponding CT value includes:

Drawing a body contour of the subject's anatomy for each image from MRI scans and CT scan to separate the body from surrounding air in the image;

Establishing region segmentation masks for images from the first set of MRI scan. When the image in the first set of MRI scan has only bony tissue or soft tissue, segment the entire MRI image as one region. When the image in the first set of MRI scan has both bony tissue and soft tissue, segment the MRI image into bone region, soft region, and mixed region, where the mixed region is the area between bone region and soft region where it is uncertain whether the tissue is bony or soft. The boundaries of each region constitute the region segmentation mask for the image. An excluded region is segmented to contain the area outside of the body contour as well as anatomical structures with significant daily motion that results in misalignment of images from multiple MRI scans and CT scan for the same position;

Applying the obtained region segmentation mask to images for the same position from all other MRI scans and the CT scan;

Extracting multiple MRI intensity values and CT value for each voxel in all regions except the excluded region; and Performing a multi-variable regression for each region to map the extracted multiple MRI intensity values of a voxel to the corresponding average CT value, which is the averaged CT value for voxels from the training data that have the same set of MRI intensity values, to determine a multi-variable high-degree polynomial mapping function:

$$CT(S_1, \ldots, S_m) = \sum_{i_1,\ldots,i_m=0}^{i_1+\ldots+i_m \leq N} \left(c_{i_1,\ldots,i_m} S_1^{i_1} \ldots S_m^{i_m}\right) = c_{0,\ldots,0} + c_{1,0,\ldots,0} S_1 + \ldots + c_{0,\ldots,0,1} S_m + \ldots + c_{1,0,\ldots,0,1} S_1 S_m + \ldots + c_{N,0,\ldots,0} S_1^N + \ldots + c_{0,\ldots,0,N} S_m^N,$$

where N is the highest polynomial degree, CT $(S_1, \ldots, S_m)$ is the dependent variable of the mapping function, $S_1$ is the intensity value from the first set of MRI scan, $S_m$ is the intensity value from the $m_{th}$ set of MRI scan, $S_1$ and $S_m$ are both independent variables, $i_1$ is the exponent for $S_1$, $i_m$ is the exponent for $S_m$, and $c_{i_1, \ldots, i_m}$ is the fitting coefficient.

A process to generate the pseudo-CT image volume of target subject from multiple MRI scans comprises of:

Acquiring multiple MRI scans of target subject using the same MRI sequence parameters as in the acquisition of multiple MRI scans of training subjects. In the preferred embodiment, the MRI scans for target subject and training subjects are acquired on the same scanning machine. In other embodiment, the MRI scans for target subject and training subjects can be acquired on different scanning machines;

Aligning images for the same position from multiple MRI scans of target subject;

Normalizing MRI images of target subject if MRI scans of target subject are acquired on different scanning machines and/or different imaging conditions from MRI scans of training subjects; this is to ensure that average MRI intensity value from target subject is the same as that from the training subjects for any given set of MRI scan;

Drawing body contour and establishing region segmentation mask for each image from the first set of MRI scan of target subject with the same process as described above for the region segmentation of training subjects except that an excluded region is not needed for target subject; the obtained region segmentation mask for image from the first set of MRI scan is applied to images from other sets of MRI scans for the same position;

Extracting the intensity values of all voxels from images of multiple MRI scans of target subject;

Obtaining the CT value of each target voxel by applying the mapping function of the corresponding region obtained from training subjects to the multiple MRI intensity values of the voxel; and The entirety of CT values determined for all voxels constitutes the pseudo-CT image volume of target subject.

A detailed exemplary example using two MRI scans to create a pseudo-CT image volume is given below:

The presented invention will now be described by referencing the appended figures representing the preferred embodiments and each step. FIG. 1 is an exemplary flowchart illustrating the steps for determining the mapping functions by using two MRI scans and CT scan from a plurality of training subjects. At step 110, training data acquired from each of a plurality of training subjects consists of two MRI scans (referred to as MRI1 and MRI2) acquired on the same MRI scanner for all training subjects and one CT scan of matching anatomical positions acquired on the same CT scanner for all training subjects. For each training subject, different MRI scan is acquired with a different MRI sequence contrast property (T1-weighted, T2-weighted). For all training subjects, a given set of MRI scan is acquired with the same MRI sequence parameter and image condition. In the preferred embodiment, a given set of MRI scan for all training subjects is acquired on the same MRI scanner with the same MRI sequence parameter and imaging condition, therefore normalization is not required.

At step 120, since the two MRI scans and CT scan are typically acquired on separate machines, corresponding images for the same position are not aligned when overlaid. Therefore, an image registration technique is needed to align each MRI image to the corresponding CT image for each training subject to ensure that the corresponding voxels match among images from multiple MRI scans and the CT scan for the same position.

At step 130, first a body contour of the training subject anatomy is drawn on all images from the two MRI scans and CT scan to separate the body from the surrounding air, and then the images are segmented into regions. Images are segmented into regions for the first set of MRI scan. If an image only has bony tissue or soft tissue, the image is segmented as one region. If an image has both bony tissue and soft tissue, the image is segmented into three regions comprising of three designations: bone region, soft region, and mixed region. In the preferred embodiment, the bone region is segmented to contain only confirmed bony anatomical structure, including cortical and spongy (cancellous) skeletal structures; the soft region is segmented to contain all confirmed non-skeletal anatomical structures; and the remaining transitional area from bone region to soft region or vice versa, where it is uncertain whether the tissue is bony or soft, is the mixed region. In addition, anatomical structures with substantial daily motion that results in insufficient image alignment among images from the two MRI scans and CT scan for the same position, as well as the area outside of the body contour, are segmented into the excluded region. In the preferred embodiment, region segmentation is completed manually or by utilizing computer generated segmentation. The boundaries of each region constitute the region segmentation mask for the image. In the preferred embodiment of segmentation, the region segmentation mask obtained for an image from MRI1 is applied to the corresponding images from MRI2 and the CT scan for the same position.

At step 140, extract from all images of training subjects an intensity value for each voxel from each of the two MRI scans and the CT scan. An exemplary example of data extracted for a given voxel is a triplet consisting of an intensity value from MRI1, an intensity value from MRI2, and a corresponding CT value. Intensity values extracted for voxels in the same region from all training subjects are grouped together. However, voxels within the excluded region designation are excluded from the training data in order to preserve the true relation between the multiple MRI intensity values and the CT value.

At step 150, in the preferred embodiment, a two-variable regression is performed for each region to map the two MRI intensity values of a voxel to the corresponding average CT value, which is the averaged CT value for training triplet data that have the same intensity value from MRI1 and the same intensity value from MRI2. An exemplary multi-variable regression uses the following two-variable high-degree polynomial mapping function:

$$CT(S_1, S_2) = \sum_{i_1, i_2=0}^{i_1, i_2 \leq N} \left( c_{i_1, i_2} S_1^{i_1} S_2^{i_2} \right) =$$

$$c_{0,0} + c_{1,0} S_1 + c_{0,1} S_2 + c_{1,1} S_1 S_2 + \ldots + c_{N,0} S_1^N + c_{0,N} S_2^N,$$

where N=30 is the highest polynomial degree, $CT(S_1, S_2)$ is the dependent variable of the mapping function, $S_1$ is the intensity value from MRI1, $S_2$ is the intensity value from MRI2, $S_1$ and $S_2$ are both independent variables, and $c_{i_1, i_2}$ is the fitting coefficient.

Figure 2:
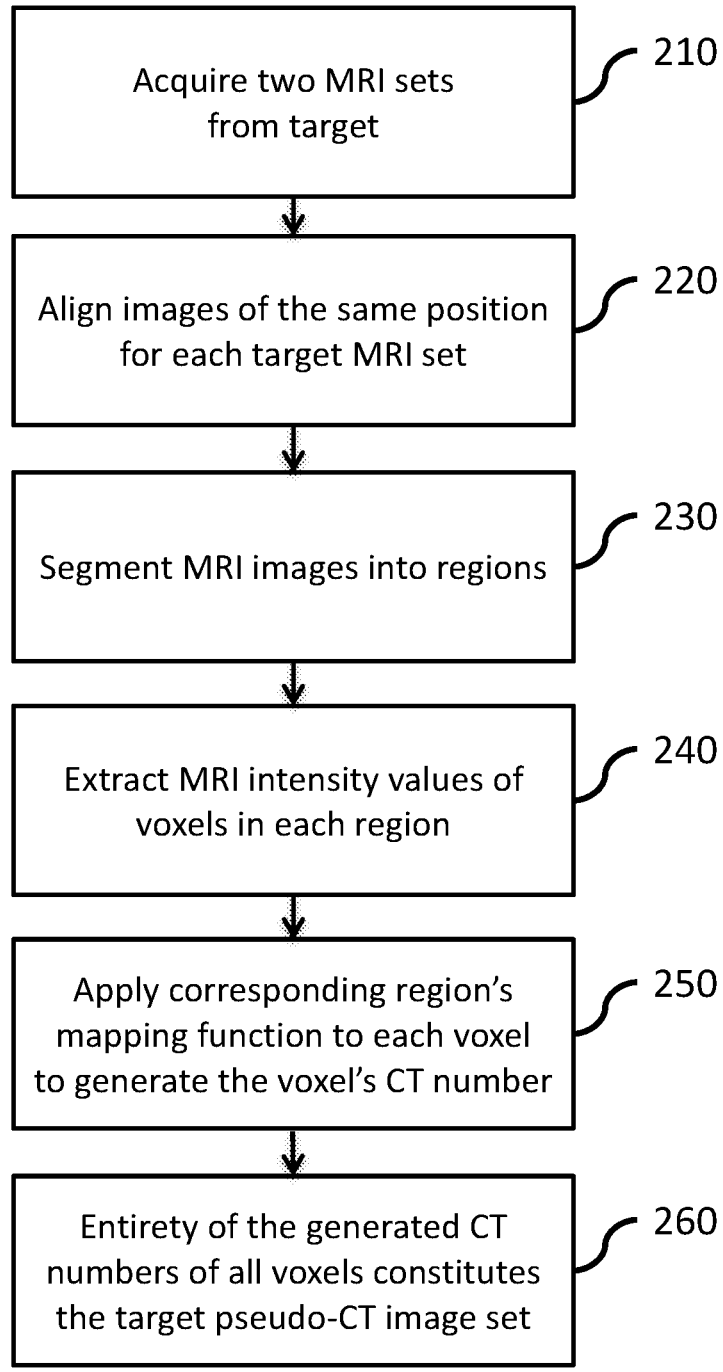
FIG. 2 is an exemplary flowchart illustrating the steps for generating a pseudo-CT image volume from two MRI scans of target subject.

FIG. 2 is an exemplary flowchart illustrating the steps for generating a pseudo-CT image volume by using two MRI scans of a target subject. At step 210, in the preferred embodiment, two MRI scans (MRI1 and MRI2) are acquired for target subject on the same MRI scanner model, imaging condition, and MRI sequence parameters as used in acquiring the two MRI scans of training subjects. Because the target MRI scans are acquired on the same MRI scanner model and imaging condition as the training data, normalization is not required.

At step 220, align images for the same position from two MRI scans of target subject;

At step 230, in the preferred embodiment, the region segmentation mask for each image from the first set of MRI scan (MRI1) of target subject is created in the same manner as described above in step 130 except that an excluded region is not needed for target subject; the obtained region segmentation mask is then applied to the image from the second set of MRI scan (MRI2) for the same position.

At step 240, in the preferred embodiment, extract from all images of target subject an intensity value for each voxel from each of the two MRI scans, namely the intensity value from MRI1 and the intensity value from MRI2.

At step 250, in the preferred embodiment, the two-variable mapping function of each region determined from training data in step 150 is applied to the corresponding region with the same designation of the target subject. First, the two independent variables are the two extracted MRI intensity values for each voxel of target subject. Next, the dependent variable is obtained by applying the two-variable high-degree polynomial mapping function determined in step 150 for the corresponding region of each voxel, thus obtaining the CT value for each voxel.

At step 260, in the preferred embodiment, the pseudo-CT values determined for all voxels of the target subject constitute the pseudo-CT image volume of the target subject. This image volume can be used for simulation of dose calculations in MRI-guided radiation therapy treatment plans and for medical imaging.

What is claimed is:

1. A method for generating a pseudo-CT image volume by using multi-variable regression analysis on multiple MRI scans, which is characterized by the following steps:
    acquire multiple MRI scans and one corresponding CT scan from a plurality of training subjects;
    align every image from multiple MRI scans to corresponding image in CT scan for each training subject;
    determine the mapping function that converts the set of MRI intensity values of a voxel to the average CT value, which is the averaged CT value for voxels from all training subjects that have the same set of MRI intensity values; and
    create the pseudo-CT image volume from multiple MRI scans of target subject.

2. The method for generating a pseudo-CT image volume by using multi-variable regression analysis on multiple MRI scans as claimed in 1, wherein for each training subject a different MRI scan is acquired using a different MRI sequence parameter and the same MRI scan for different training subjects is acquired using the same MRI sequence parameter.

3. The method for generating a pseudo-CT image volume by using multi-variable regression analysis on multiple MRI scans as claimed in 1, wherein a normalization is required to ensure that the average intensities for the same MRI scan from different training subjects are the same when the same MRI scan from different training subject is acquired using a different scanner and/or image condition.

4. The method for generating a pseudo-CT image volume by using multi-variable regression analysis on multiple MRI scans as claimed in 1, wherein the mapping function is determined by steps comprising of:
    drawing a body contour for each MRI image and CT image separately;
    establishing region segmentation masks for images from the first set of MRI scan;
    applying obtained region segmentation mask to create region segmentation for images from other MRI scans and the CT scan for the same position of the same training subject;
    extracting from each region except for the excluded region the MRI intensity values and CT value for each voxel; and
    using a multi-variable regression analysis to determine for each region the multi-variable high-degree polynomial mapping function that converts the set of MRI intensity values of a voxel to the average CT value that is the averaged CT value for voxels that have the same set of MRI intensity values.

5. The method for determining the mapping function as claimed in 4, wherein the body contour is to separate the body from surrounding air in the image.

6. The method for determining the mapping function as claimed in 4, wherein establishing the said region segmentation mask for an image from the first set of MRI scan comprises of:
    segmenting the image into one region when there is only bony tissue or only soft tissue;
    segmenting the image into bone region, soft region, and mixed region when there is both bony tissue and soft tissue; and
    the boundaries of said regions constitute the region segmentation mask.

7. The method for establishing region segmentation masks as claimed in 6, wherein the mixed region is the area between bone region and soft region where it is uncertain whether the tissue is bony or soft.

8. The method for establishing region segmentation masks as claimed in 6, wherein the excluded region contains the area outside of the body contour as well as anatomical structures with significant daily motion that results in misalignment of images from multiple MRI scans and CT scan for the same position.

9. The method for generating a pseudo-CT image volume by using multi-variable regression analysis on multiple MRI scans as claimed in 1, wherein the generation of a pseudo-CT image volume is characterized by the following steps:
    acquiring multiple MRI scans for target subject with the same MRI sequence parameters used in acquiring multiple MRI scans of training subjects;
    aligning images for the same position from multiple MRI scans of target subject;
    performing normalization when a MRI scan from target subject and the corresponding MRI scan from training subjects are acquired on different scanners and/or image conditions to ensure that average intensities of target subject and training subjects from the same MRI sequence parameter are the same;
    creating region segmentation masks for target images from the first set of MRI scan using the same region segmentation process as described above for training subjects and applying obtained region segmentation mask to create region segmentation for target images from other MRI scans at the same position except that an excluded region is not needed for MRI images of target subject;

apply the obtained region segmentation masks to all other MRI scans of target subject at the same position;

extracting the intensity values from all voxels in images from multiple MRI scans of target subject;

obtaining the CT value of each target voxel by applying the mapping function of the corresponding region obtained from training subjects to the multiple MRI intensity values of the voxel; and using the entirety of generated CT values for all target voxels to constitute the pseudo-CT image volume of target subject.

* * * * *